US009250107B2

(12) United States Patent
Fieser et al.

(10) Patent No.: US 9,250,107 B2
(45) Date of Patent: Feb. 2, 2016

(54) CUSTOMIZABLE AVERAGING PITOT TUBE PROBE AND PROCESS VARIABLE TRANSMITTER

(71) Applicant: Dieterich Standard, Inc., Boulder, CO (US)

(72) Inventors: Brian Anthony Fieser, Aurora, CO (US); John Everett Garnett, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 151 days.

(21) Appl. No.: 14/029,207

(22) Filed: Sep. 17, 2013

(65) Prior Publication Data

US 2015/0075293 A1  Mar. 19, 2015

(51) Int. Cl.
*G01F 1/46* (2006.01)
*G01P 5/165* (2006.01)
*G01F 1/36* (2006.01)

(52) U.S. Cl.
CPC ........ *G01F 1/46* (2013.01); *G01F 1/363* (2013.01); *G01P 5/165* (2013.01); *Y10T 29/49826* (2015.01)

(58) Field of Classification Search
CPC .................................. G01F 1/46; G01P 5/165
USPC ....................................................... 73/861.67
See application file for complete search history.

(56) References Cited

U.S. PATENT DOCUMENTS 3,751,982 A * 8/1973 Lambert .................. 73/861.66
3,765,241 A   10/1973 Lambert
4,592,239 A * 6/1986 Cutler ..................... 73/861.66
4,717,159 A   1/1988 Alston et al.
5,710,370 A   1/1998 Shanahan et al.
(Continued)

FOREIGN PATENT DOCUMENTS

CN          203116754 U       8/2013

OTHER PUBLICATIONS

Authors: John Good and Vince Cisar, Title: Averaging pitot tubes, Date: Jun. 6, 2006, Publication: Plant Services, URL: http://www.plantservices.com/articles/2006/153/ , accessed: Apr. 13, 2015, pp. 11.*

(Continued)

*Primary Examiner* — Lisa Caputo
*Assistant Examiner* — Roger Hernandez-Prewitt
(74) *Attorney, Agent, or Firm* — Westman, Champlin & Koehler, P.A.

(57) ABSTRACT

A customizable length averaging pitot tube (APT) probe for insertion into a confined conduit is disclosed. The APT probe includes a probe portion, configured to be inserted into the confined conduit, which includes longitudinally extending upstream, downstream and middle surfaces to form first and second fluid carrying plenums within the APT probe portion. A plurality of longitudinally arranged openings are disposed along the length of the upstream surface with each opening in fluid communication with the first fluid carrying plenum. A plurality of longitudinally arranged openings are disposed along the length of the downstream surface with each opening in fluid communication with the second fluid carrying plenum. A cap is affixed to an end of the APT probe portion to isolate the first and second fluid carrying plenums. An elongated body is coupled to the APT probe portion and provides fluid passageways fluidically coupled to the first and second plenums.

19 Claims, 7 Drawing Sheets

(56) References Cited

U.S. PATENT DOCUMENTS

| | | | |
|---|---|---|---|
| 5,753,825 A * | 5/1998 | Brandt, Jr. | 73/861.66 |
| 5,773,726 A | 6/1998 | Mahoney et al. | |
| 5,817,950 A * | 10/1998 | Wiklund et al. | 73/861.66 |
| 5,969,266 A | 10/1999 | Mahoney et al. | |
| 6,321,166 B1 | 11/2001 | Evans et al. | |
| 6,470,755 B1 * | 10/2002 | Beachey et al. | 73/756 |
| 7,561,056 B2 * | 7/2009 | McMillan | 340/603 |
| 2013/0283928 A1 | 10/2013 | Wiklund | |

OTHER PUBLICATIONS

Authors: Ian F. Akyildiz, Mehmet Can Vuran, Title: Wireless Sensor Networks, Date: Jun. 10, 2010, Publisher: John Wiley & Sons—Technology & Engineering, Pertinent Pages: p. 7 of 520.*

Title: Bulletin F-AFG, Series AFG Averaging Flow Grid, Date: Dec., 2005, Publisher: Dwyer Instruments, Inc., pp. 6.*

Rosemount Drawings No. 00485-1010 entitled "Dimension Drawing Model, 485 Annubar Flowmeter (3051SFA, 3051CFA, 3095MFA) Sensor Size 2 Flange-Lok 150# - 600# ANSI", dated Jan. 9, 2006, 3 pgs.

Rosemount Drawings No. 00585-1000 entitled "Dimension Drawing, Model 585, Flanged W/Opposite SDE Support", dated Feb. 4, 2009, 6 pgs.

Rosemount 485 Annubar Pak-Lok Assembly, Quick Installation Guide—Rosemount 00825-0300-4809, Jan. 2012. 18 pgs, and Rosemount 485 Annulbar Flange-Lok Assembly Quick Installation Guide 00825-0200-4809 Rev DB, Dec. 2009, 16 pgs.

Notification of Transmittal of the International Search Report and the Written Opinion of the International Searching Authority from PCT/US2014/050670, dated Oct. 17, 2014.

* cited by examiner

CUSTOMIZABLE AVERAGING PITOT TUBE PROBE AND PROCESS VARIABLE TRANSMITTER

FIELD

The present disclosure relates to industrial process control or monitoring systems. More specifically, the present disclosure relates to process variable transmitters of the type which use averaging pitot tube (APT) probes to measure a process variable of an industrial process.

BACKGROUND

In industrial settings, control systems are used to monitor and control inventories of industrial and chemical processes, and the like. Typically, the control system that performs these functions uses field devices distributed at key locations in the industrial process and coupled to control circuitry in the control room by a process control loop. The term "field device" refers to any device that performs a function in a distributed control or process monitoring system, including all devices used in the measurement, control and monitoring of industrial processes.

Some field devices include a transducer which couples to the process fluid. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, actuators, solenoids, indicator lights, and others.

Field devices, such as process variable sensors used in industrial processes can be installed in the field on pipelines, tanks and other industrial process equipment. Such devices sense process variables such as process fluid flow, process fluid temperature, process fluid pressure, process fluid conductivity, process fluid pH and other process variables. Other types of industrial process field devices include valves, actuators, field controllers, data displays and communication equipment such as industrial field network bridges.

One type of process variable sensor is a flow meter that can measure a rate of fluid flow, for example. One type of flow meter, which employs an averaging pitot tube (APT), is a popular device for flow measurement because of its ability to be inserted into and retracted from a flow line, its low pressure loss, relatively low cost and reliable performance. The APT senses and averages pressures from multiple locations across a pipeline through which a process fluid is traveling. This average pressure is then used in conjunction with flow theory and experimentally determined quantities to provide a flow measurement for the fluid. One type of APT is the Annubar® APT available from Dieterich Standard, Inc. of Boulder, Colo. At least for Annubar® type APTs, it is required that the APT span the process pipeline such that multiple samples across a section of the pipeline can be averaged to account for variations in flow across the section.

Because of different customer needs, installation requirements, etc., manufacturers of APT type probes and transmitters typically have to manufacture and stock a number of different sizes of the APT probes to accommodate different pipe diameters. Further, different APT probes or transmitters are manufactured and stocked to accommodate different types of connections to the process pipeline. As a result, manufacturing is made more complex and expensive. Further, longer lead times for getting APT probes or transmitters to customers are common.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

In one example embodiment, a customizable length averaging pitot tube (APT) probe for insertion into a confined conduit, such as a process pipe, is disclosed. The APT probe includes a probe portion configured to be inserted into the confined conduit. The APT probe portion comprising a longitudinally extending upstream surface, a longitudinally extending downstream surface, and a middle surface positioned between the upstream surface and the downstream surface to form first and second fluid carrying plenums within the APT probe portion. The APT probe portion further comprising a plurality of longitudinally arranged openings in the upstream surface disposed along the length of the upstream surface with each opening in fluid communication with the first fluid carrying plenum, and a plurality of longitudinally arranged openings in the downstream surface disposed along the length of the downstream surface with each opening in fluid communication with the second fluid carrying plenum. A cap is affixed to an end of the APT probe portion to isolate the first and second fluid carrying plenums at the end of the APT probe portion. The cap can be affixed to the end of the APT probe portion after the probe portion has been cut to customize the APT probe for a particular sized conduit. An elongated body is coupled to the APT probe portion and provides fluid passageways fluidically coupled to the first and second plenums for coupling process pressures from the first and second plenums to a pressure sensor.

In one embodiment, the customizable length APT probe further comprises an electronics connection mounted on the elongated body and having first and second ports in fluid communication with the first and second plenums through the fluid passageways.

In one embodiment, the elongated body has a diameter which is larger than a diameter of the APT probe section. The elongated body is configured, in an embodiment, to couple the customizable APT probe to the confined conduit using a plurality of different types of connection hardware configurations.

In one embodiment, the APT probe portion is configured with the plurality of longitudinally arranged openings in the upstream surface and in the downstream surface such that the upstream surface, the downstream surface and the middle surface can be cut to produce a plurality of desired probe lengths to accommodate different conduit diameters while maintaining structural integrity of the APT probe portion.

In one embodiment, a process variable monitoring system is provided including a process variable transmitter with a pressure sensor, the APT probe portion, the cap and the elongated body.

DETAILED DESCRIPTION OF ILLUSTRATIVE EMBODIMENTS

Figure 1:
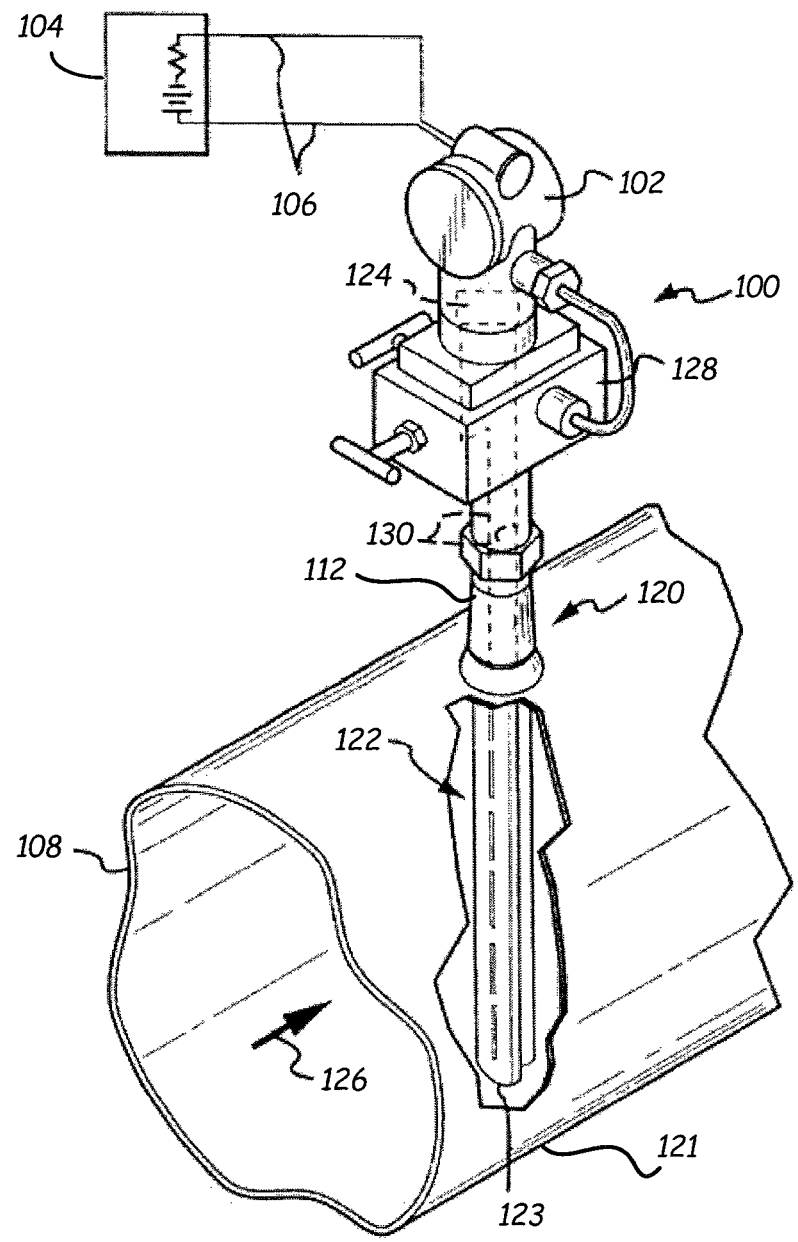
FIG. 1 is a diagrammatic illustration of an industrial process control or monitoring system for use in monitoring or controlling a process fluid in accordance with an example embodiment.

FIG. 1 is a simplified diagram showing an industrial process control or monitoring system 100 for use in monitoring or controlling a process fluid in an industrial process. Typically, a field device such as a process variable transmitter 102 is located at a remote location in a field, and transmits a sensed process variable back to a centrally-located control room 104. Various techniques can be used for transmitting the process variable, including both wired and wireless communications. One common wired communication technique uses what is known as a two-wire process control loop 106 in which a single pair of wires is used to both carry information as well as provide power to the transmitter 102. One technique for transmitting information is by controlling the current level through the process control loop 106 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including WirelessHART®, may also be implemented. Process control loop 106 in FIG. 1 represents either or both of wired and wireless embodiments of communication connections between transmitter 102 and control room 104.

Process variable transmitter 102 is connected, via a mounting element or apparatus 112, one example embodiment of which is shown in FIG. 1, to a probe 120 which extends into process piping 108 and is configured to measure a process variable of a process fluid in the process piping 108. Example process variables include flow, temperature, pressure, level, pH, conductivity, turbidity, density, concentration, chemical composition, etc. Process variable transmitter 102 includes a sensor 124 and other components/circuitry (not shown in FIG. 1) that are configured to receive a process variable from probe 120 and provide a transmitter output on process control loop 106.

In exemplary embodiments, process variable transmitter 102 is a differential pressure transmitter and probe 120 is an averaging pitot tube (APT) type of probe. Components of differential pressure transmitter 102 and averaging pitot tube 120 are described below in in greater detail.

In FIG. 1, the cut away portion of process conduit or pipe 108 allows portion 122 of APT probe 120, which diametrically spans the inside of process pipe 108, to be seen. The directional arrow 126 indicates the direction of fluid flow in pipe 108. In one example embodiment, a fluid manifold 128 and the flow transmitter 102 are shown mounted on the exterior end of APT probe 120. In these APT probe embodiments, sensor 124 of transmitter 102 is a pressure sensor 124 that is fluidically coupled to probe 120 through passageways 130 (shown in phantom in FIG. 1).

As will be described below in greater detail, APT probe 120 is of a stitched design that allows the probe to be cut to a desired length for a particular diameter process pipe 108, while still maintaining structural and measurement integrity. By using this stitched design, instead of manufacturing many different APT probe lengths for different process pope diameters in different installations, a single probe length can be manufactured to cover a wide variety of applications. The APT probes of this single probe length can be stocked at a distribution hub to improve lead time in supplying probes to customers. Manufacturing a single probe length also provides the potential for improved factory performance in the manufacturing process by reducing the number of variations of the APT probes built. To supply an APT probe to a particular customer for a particular application requiring a specific probe length, excess material is cut from an end of probe 120, and the end is finished at the distribution hub or elsewhere with a cap or other finishing mechanism 123. In exemplary embodiments, in order to reduce stresses applied to the APT probe, an opposite side support structure is provided at side 121 of process pipe 108. Such a structure is omitted from FIG. 1, but is shown for example in FIG. 5. Opposite side support structures are useful in preventing the APT probe from breaking off due to the stresses applied by process fluid flow within the process pipe. However, opposite side support structures are not required in all embodiments.

Figure 2:
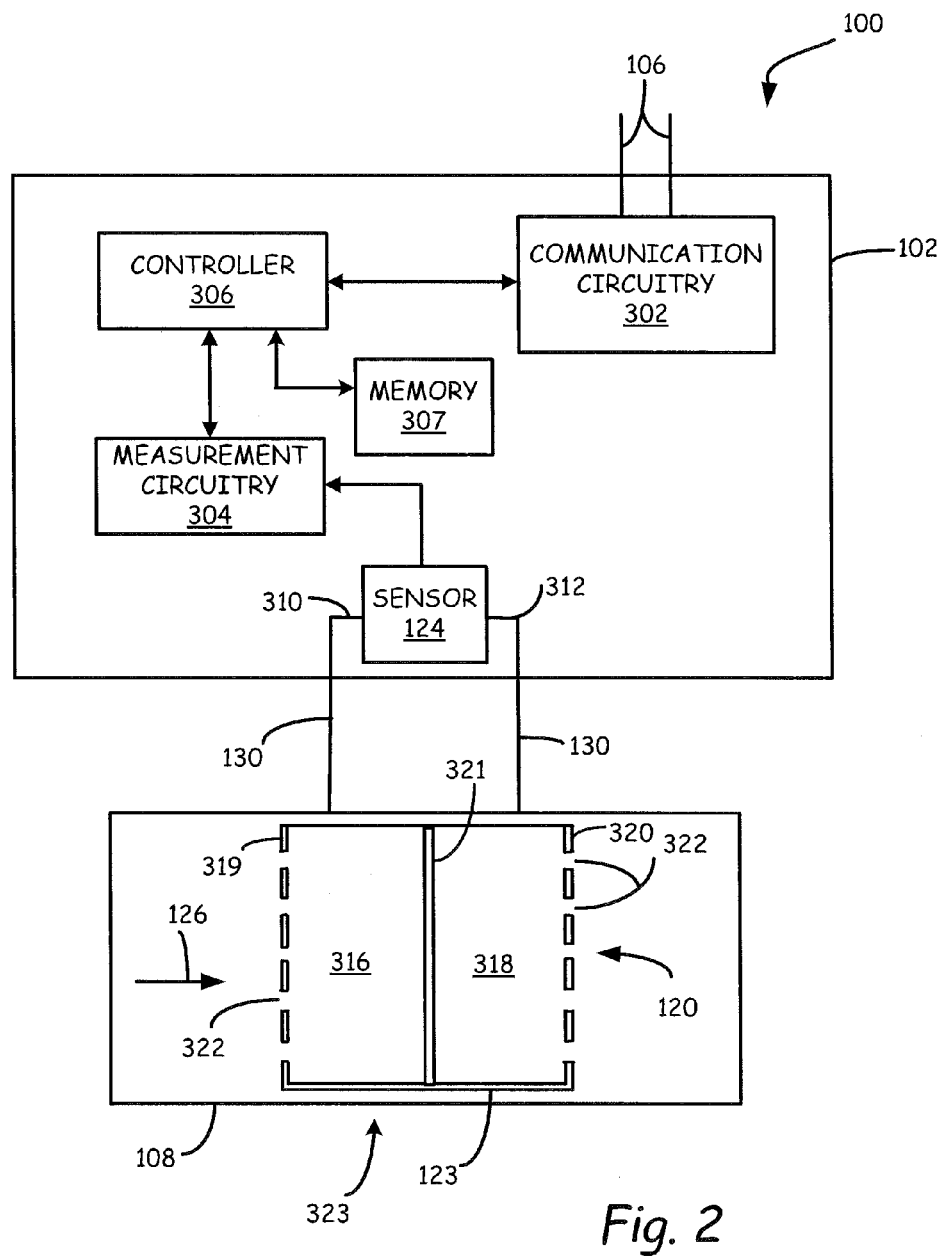
FIG. 2 is a block diagram of the system and transmitter shown in FIG. 1 in accordance with an example embodiment.

FIG. 2 is a system block diagram of an exemplary differential pressure measurement system embodiment of monitoring system 100. As shown, system 100 includes flow transmitter 102 and differential pressure measurement probe 120. System 100 is coupleable to a process control loop such as loop 106 and is adapted to communicate a process variable output related to a differential pressure of fluid flow within pipe 108. Transmitter 102 of system 100 includes a loop communication circuitry 302, pressure sensor 124, measurement circuitry 304, and controller 306.

Loop communication circuitry 302 is coupleable to the process control loop 106 and is adapted to communicate upon the process control loop. Loop communication circuitry 302 can include circuitry for communicating over a wired communication link and/or a wireless communication link. Such communication can be in accordance with any appropriate process industry standard protocol such as the protocols discussed above, including both wired and wireless protocols.

Pressure sensor 124 includes first and second ports 310, 312 which are coupled to first and second plenums 316, 318 of APT probe 120, respectively, through passageways 130. Sensor 124 can be any device that has an electrical characteristic that changes in response to changes in applied pressure. For example, sensor 124 can be a capacitive pressure sensor the capacitance of which changes in response to the differential pressure applied between ports 310 and 312.

Measurement circuitry 304 is coupled to sensor 124 and is configured to provide a sensor output related at least to differential pressure between ports 310 and 312. Measurement circuitry 304 can be any electronic circuitry that can provide a suitable signal related to differential pressure. For example, measurement circuitry can be an analog-to-digital converter, a capacitance-to-digital converter or any other appropriate circuitry.

Controller 306 is coupled to measurement circuitry 304 and loop communication circuitry 302. Controller 306 is adapted to provide a process variable output to loop communication circuitry 302, which output is related to the sensor output provided by measurement circuitry 304. Controller 306 can be a programmable gate array device, a microprocessor, or any other appropriate device or devices. Although loop communication circuitry 302, measurement circuitry 304 and controller 306 have been described with respect to individual modules, it is contemplated that they can be combined such as on an Application Specific Integrated Circuit (ASIC). In an exemplary embodiment, memory 307 is included and is coupled to controller 306 for storage of computer readable instructions, parameter values, etc. used to configure controller 306 and/or measurement circuitry 304. In some such embodiments, configuration information is stored in memory 307 based on the selected length of APT probe 120 such that the probe and transmitter 102 are optimized or configured to provide process variable outputs based on the selected probe length.

APT probe 120 is coupled to transmitter 102 by passageways 130. Thus, port 310 of sensor 124 is coupled to first plenum 316, while port 312 of sensor 124 is coupled to second plenum 318. A "plenum" is a passageway, a channel, a tube or the like into which fluid of a particular character or pressure is directed or admitted and through which the fluid is conducted or conveyed.

As described above, APT probe 120 has a stitched design that allows the probe to be cut to a desired length for a particular diameter process pipe 108, while still maintaining structural and measurement integrity. As shown diagrammatically in FIG. 2, probe 120 includes an upstream surface or surface 319 extending the length of the probe, a downstream surface or surface 320 extending the length of the probe, and a middle or center surface or surface 321 separating plenums 316 and 318. Plenums 316 and 318 are formed between surfaces 319 and 321, and between surfaces 320 and 321, respectively. A plurality of small longitudinal openings or slots 322 are formed in each of upstream surface 319 and downstream surface 320 along the length of probe 120, allowing process fluid to enter plenums 316 and 318. Sensor 124 measures a differential pressure corresponding to the differential pressure between the process fluid in plenums 316 and 318. A cap or sealing structure 123 is fixed to distal end 323 of probe 120 to aid in separating plenums 316 and 318. The sealing structure 123, referred to here as a cap, can also include plugs which insert into fixed end 323 to seal end 323. The term cap is intended to include plugs and other sealing structures. Cap 123 is typically attached to end 323 of probe 120 at a distribution hub or elsewhere after probe 120 has been cut to a desired length to accommodate a particular diameter of process pipe 108 and to accommodate a particular installation type. The small slot design of probe 120 allows the probe to maintain structural integrity and measurement accuracy after the probe has been cut to a desired size.

Figure 3:
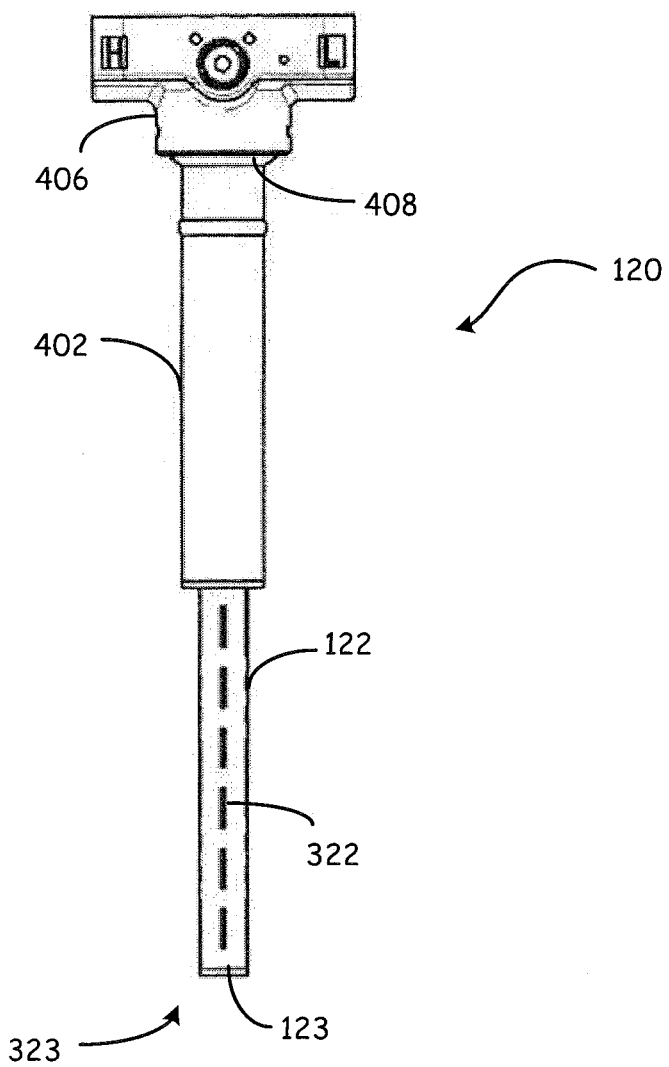
FIG. 3 is an illustration of an embodiment of an APT probe.

Referring now to FIG. 3, shown is an illustration of a universal probe or probe unit 120 in accordance with some exemplary embodiments. The probe 120 is "universal" in that it manufactured to fit into a wide range of customer applications, with minor modifications and finishing a distribution hub, in process pipes of varying diameters and using various types of connections. Portion 122 discussed above includes slots 322 configured to allow portion 122 of the APT probe to be cut to lengths which diametrically span the insides of corresponding process pipes of varying sizes. This stitched slot pattern with multiple longitudinally arranged short ports 322 allows the full length of the unit to be available for measurement or to be cut to the desired length, while maintaining full averaging capabilities after being shortened. After the excess material is cut from the end 323, the probe is finished with a cap 123 as discussed above.

In the embodiment illustrated in FIG. 3, probe 120 includes an upper portion, which sits outside of a process pipe, having a preferably elongated body 402 that provides a long transition structure, allowing use of probe 120 with multiple different connection hardware types depending upon customer needs. For example, a flanged connection type in which the probe is coupled to the process pipe using a pair of flanges can be used. One such flanged connection type which can be used is available from Rosemount Inc. under the product name Flange-Lok. Another connection type which can be used to couple the probe to the process pipe utilizes a probe receiving body, itself coupled to the process pipe, to receive the probe and provide the connection to the process pipe. One such probe receiving body type of connection is available from Rosemount Inc. under the product name Pak-Lok. An electronics connection platform 406 of probe 120 can mount directly to a transmitter, such as transmitter 102 discussed above, but also has a threaded connection 408 to easily adapt probe 120 for use with hardware which is used to mount electronics remotely from the location of probe 120.

Figure 4:
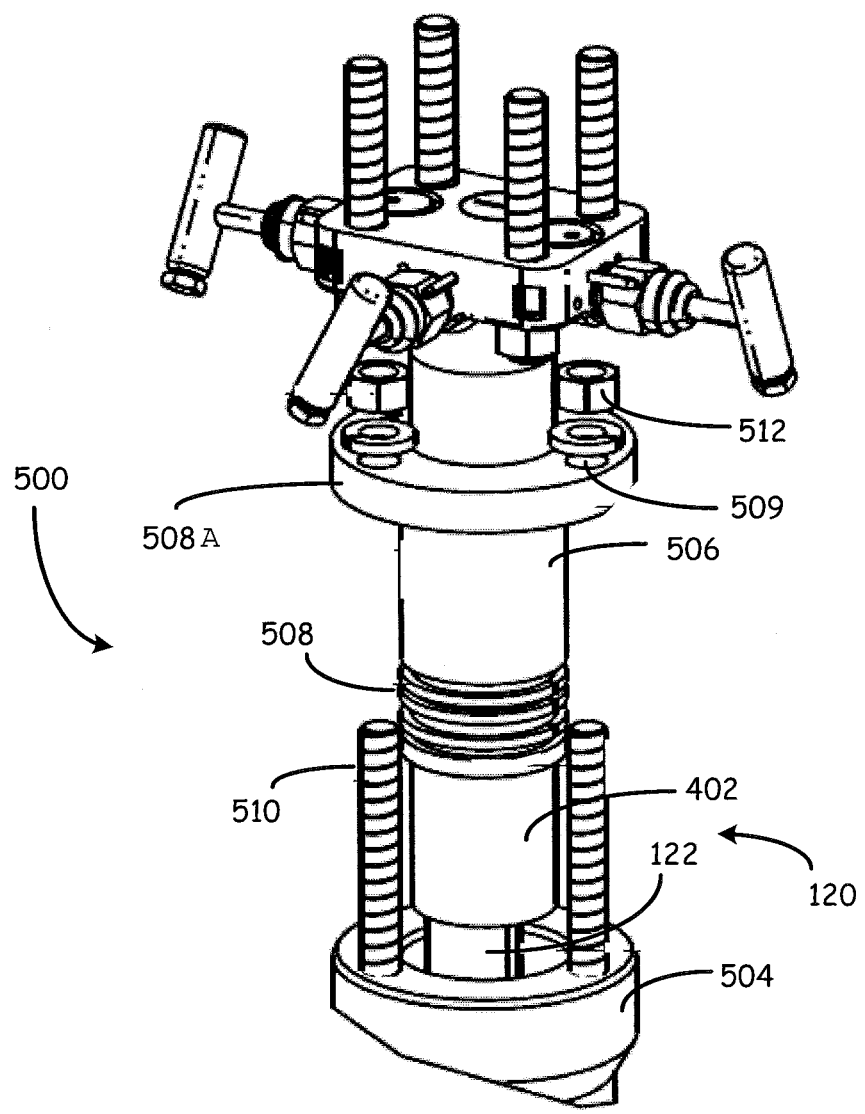
FIGS. 4 and 5 are illustrations of the probe of FIG. 3 coupled to a process using different connection types and apparatus.
Figure 5:
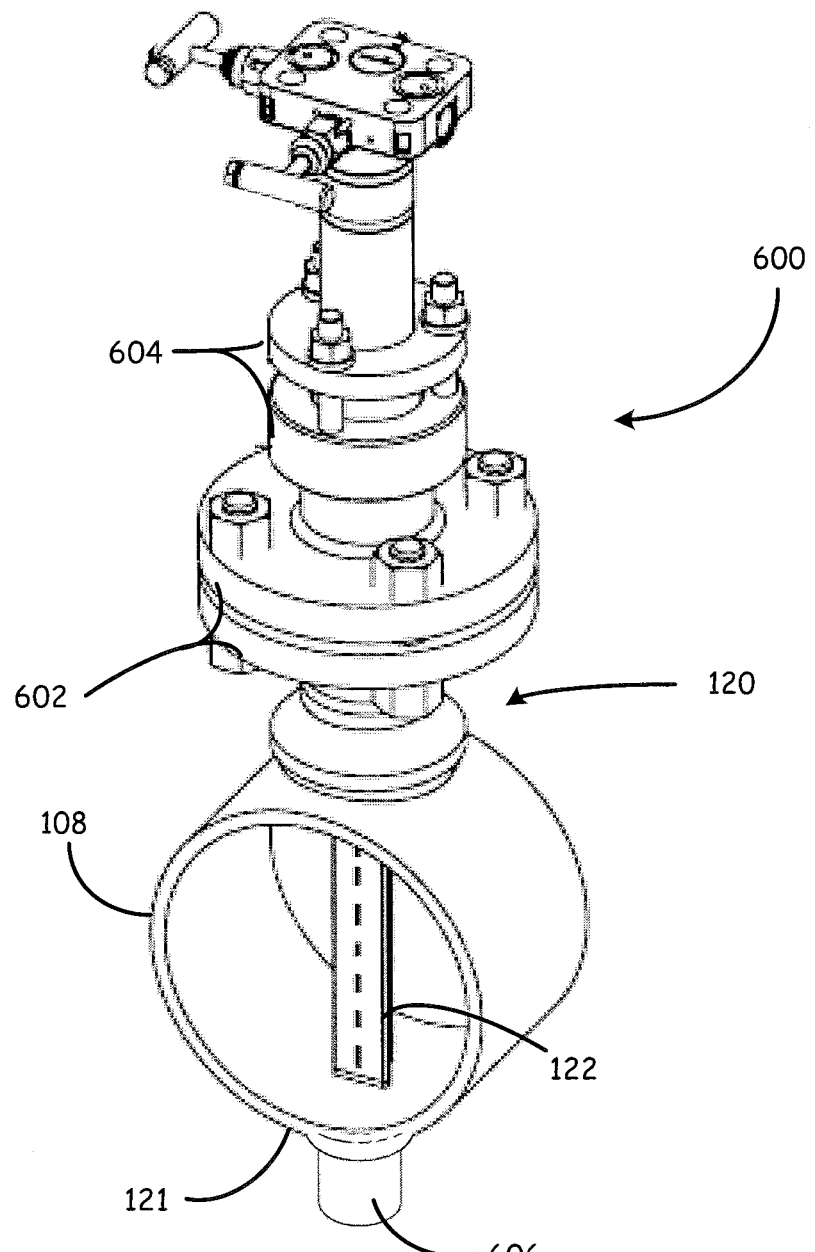

FIGS. 4 and 5 illustrate two examples of connection hardware configurations which can be used to connect probe 120 to a process pipe. FIG. 4 illustrates probe 120 mounted with a probe receiving body type connection. FIG. 5 illustrates probe 120 mounted with a flange type connection.

Referring more specifically to FIG. 4, in the configuration of a probe receiving body type connection 500, the portion 122 of APT probe 120 extends through a body 504 attached to the process pipe 108 (not shown). Elongated body 402 of probe 120 extends above body 504, and is coupled to a follower body 506, separated by packing rings 508. A compression plate 508A includes apertures 509 arranged to receive studs 510 connected to body 504. Fasteners 512 attach to ends of studs 510 extending through apertures 509 of compression plate 508A to secure probe 120 to the process piping. In FIG. 5, in the configuration of a flange type connection 600, probe 120 is secured to process pipe 108 using mounting flanges 602 and a packing assembly 604.

Also shown in FIG. 5 is opposite side support structure 606 provided at side 121 of process pipe 108. Opposite side support structure 606 can be any type of connection, such as a flange connection, which provides support to portion 122 of APT probe 120 at the distal end of the probe which extends to side 121 of pipe 108. For example, support structure 606 can include a stud which extends through the side 121 of the process pipe and into the distal end of probe portion 122. As discussed above, opposite side support structures are useful in preventing the APT probe from being damaged by the stresses applied by process fluid flow within the process pipe.

Figure 6C:
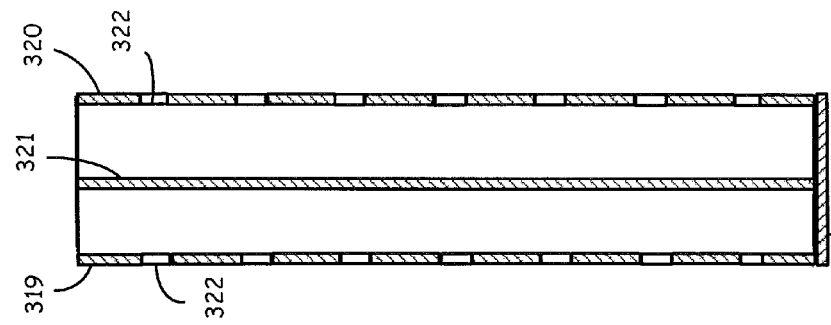
FIGS. 6a, 6b and 6c are diagrammatic cross sectional views showing processing steps of customizing an APT probe for particular process requirements.
Figure 6B:
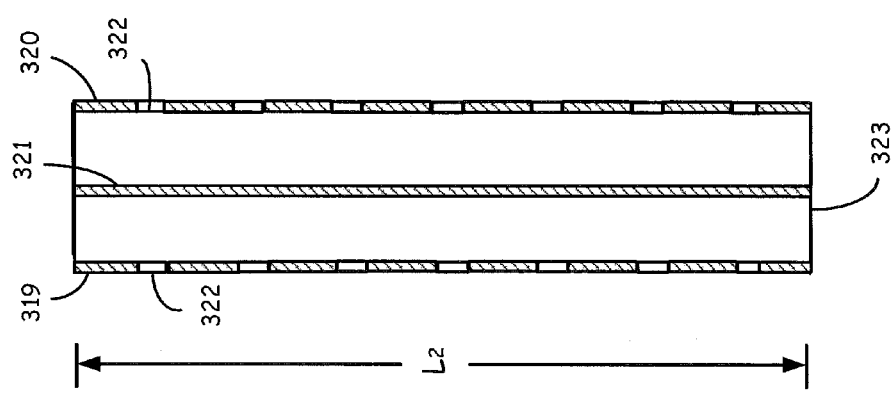
Figure 6A:
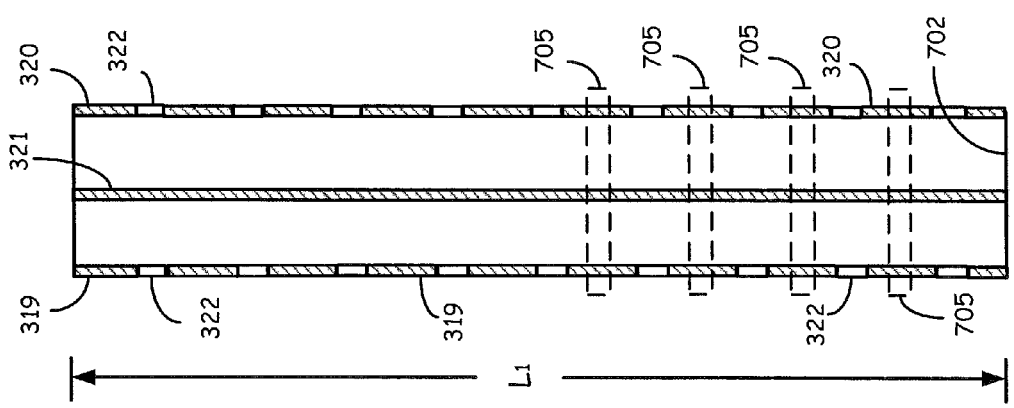

FIGS. 6a-6c illustrate processing steps in configuring universal APT 120 by cutting the stitched slot pattern portion of the probe for a particular diameter of process pipe. As shown in FIG. 6a, the stitched slot pattern portion of probe 120 is manufactured with an original length $L_1$. The entire length $L_1$ can be inserted into a process pipe if a particular installation requires this length of probe. However, in order to configure the probe for a smaller diameter process pipe, a distal end 702 of the stitched slot pattern portion can be cut to reduce the length of this portion to a shorter length $L_2$, resulting in new distal end 323 as shown in FIG. 6b. In an exemplary embodiment, predefined cutting regions 705 corresponding to various known process pipe diameters can be included on probe 120. Cutting regions 705 can include visual indicators of where to cut for various process pipe diameters and/or for use with different types of mounting hardware. In some embodiments, cutting regions 705 can include physical characteristics, such as defined notches or other features which aid in cutting probe 120 to a particular length. Then, as shown in FIG. 6c, a cap or plug 123 can be fixed to end 323 using an attachment such as a weld, an adhesive or an attachment mechanism.

Figure 7:
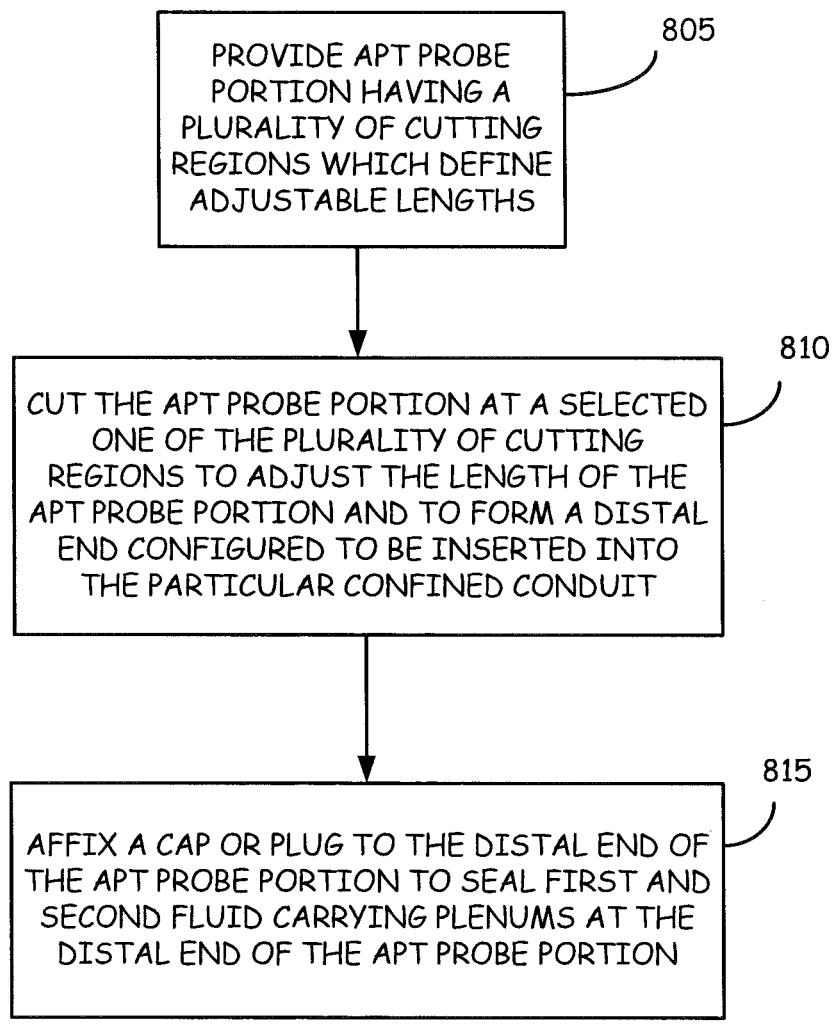
FIG. 7 is a flow diagram illustrating a method of customizing a length of an APT probe.

Referring now to FIG. 7, shown is a flow diagram illustrating one exemplary method of customizing an APT probe for insertion into a particular confined conduit in accordance with the above disclosure. First, as shown at step 805, the method includes providing an APT probe portion having a plurality of cutting regions 705 which define adjustable lengths of the APT probe portion. As discussed above, the APT probe portion comprises a longitudinally extending upstream surface and a longitudinally extending downstream surface which form first and second fluid carrying plenums within the APT probe portion. The APT probe portion further comprises a plurality of longitudinally arranged openings in the upstream surface disposed along a length of the upstream surface with each opening in fluid communication with the first fluid carrying plenum, and a plurality of longitudinally arranged openings in the downstream surface disposed along a length of the downstream surface with each opening in fluid communication with the second fluid carrying plenum.

Also, as shown at step 810, the method includes cutting the APT probe portion at a selected one of the plurality of cutting regions to adjust the length of the APT probe portion and to form a distal end 323 configured to be inserted into the particular confined conduit. Thereafter, as shown at step 815, the method includes affixing a cap or plug 123 to the distal end 323 of the APT probe portion. The cap seals the first and second fluid carrying plenums at the distal end.

Methods of disclosed embodiments can include steps in accordance with any of the features discussed with reference to FIGS. 1-6 as well.

Although the present invention has been described with reference to preferred embodiments, workers skilled in the art will recognize that changes may be made in form and detail without departing from the spirit and scope of the invention. Although slots and circular openings are shown in the exemplary APT probe embodiments, the openings are not limited to these shapes, and in other embodiments the openings have other shapes.

What is claimed is:

1. A method of customizing an averaging pitot tube (APT) probe for insertion into a particular confined conduit, the method comprising:
providing an APT probe portion having a plurality of predefined cutting regions identified by visual indicators which define adjustable lengths of the APT probe portion, the APT probe portion comprising a longitudinally extending upstream surface and a longitudinally extending downstream surface which form first and second fluid carrying plenums within the APT probe portion, the APT probe portion further comprising a plurality of longitudinally arranged openings in the upstream surface disposed along a length of the upstream surface with each opening in fluid communication with the first fluid carrying plenum, and a plurality of longitudinally arranged openings in the downstream surface disposed along a length of the downstream surface with each opening in fluid communication with the second fluid carrying plenum;
cutting the APT probe portion at a selected one of the plurality of cutting regions to adjust the length of the APT probe portion and to form a distal end configured to be inserted into the particular confined conduit; and
affixing a cap to the distal end of the APT probe portion, the cap sealing the first and second fluid carrying plenums at the distal end of the APT probe portion.

2. The method of claim 1, and further comprising storing configuration information in a memory device based on an adjusted length of the APT probe portion.

3. A customizable length averaging pitot tube (APT) probe for insertion into a confined conduit, the APT probe comprising:
an APT probe portion having an adjustable length which extends to a distal end configured to be inserted into the confined conduit, the APT probe portion comprising a longitudinally extending upstream surface and a longitudinally extending downstream surface which form first and second fluid carrying plenums within the APT probe portion, the APT probe portion further comprising a plurality of longitudinally arranged openings in the upstream surface disposed along a length of the upstream surface with each opening in fluid communication with the first fluid carrying plenum, and a plurality of longitudinally arranged openings in the downstream surface disposed along a length of the downstream surface with each opening in fluid communication with the second fluid carrying plenum;
a cap affixed to the distal end of the APT probe portion, the cap sealing the first and second fluid carrying plenums at the distal end of the APT probe portion; and
an elongated body coupled to the APT probe portion and providing fluid passageways fluidically coupled to the first and second plenums for coupling process pressures from the first and second plenums to a pressure sensor;
wherein the distal end comprises
a plurality of predefined cutting regions selected for the particular confined conduit, the predefined cutting regions comprising visual indicators, wherein the visual indicators are configured to provide an indication where to cut for various process pipe diameters, the predefined cutting regions corresponding to known various process pipe diameters, and the APT probe portion distal end formed by cutting the APT probe portion at the one of the plurality of predefined cutting regions prior to affixing the cap to the distal end to customize the length of the APT probe.

4. The customizable length APT probe of claim 3, and further comprising an electronics connection mounted on the elongated body, the electronics connection having first and second ports in fluid communication with the first and second plenums through the fluid passageways.

5. The customizable length APT probe of claim 3, wherein the elongated body has a diameter which is larger than a diameter of the APT probe section.

6. The customizable length APT probe of claim 5, wherein the elongated body is configured to couple the customizable APT probe to the confined conduit using a plurality of different types of connection hardware configurations.

7. The customizable length APT probe of claim 6, wherein the APT probe portion is configured with the plurality of longitudinally arranged openings in the upstream surface and in the downstream surface such that the upstream surface and the downstream surface can be cut to produce a plurality of desired probe lengths to accommodate different conduit diameters while maintaining structural integrity of the APT probe portion.

8. The customizable length averaging pitot tube probe of claim 3, wherein the visual indicators include physical characteristics, the physical characteristics comprising predefined notches.

9. A process variable monitoring system for measuring a process variable indicative of a flow rate of a process fluid in a process pipe, the system comprising:
- a process variable transmitter;
- a pressure sensor in the process variable transmitter;
- an APT probe portion having an adjustable length which extends to a distal end configured to be inserted into the pipe, the APT probe portion comprising a longitudinally extending upstream surface and a longitudinally extending downstream surface which form first and second fluid carrying plenums within the APT probe portion, the APT probe portion further comprising a plurality of longitudinally arranged openings in the upstream surface disposed along a length of the upstream surface with each opening in fluid communication with the first fluid carrying plenum, and a plurality of longitudinally arranged openings in the downstream surface disposed along a length of the downstream surface with each opening in fluid communication with the second fluid carrying plenum;
- a cap affixed to the distal end of the APT probe portion to seal the distal end of the APT probe portion after the APT probe portion has been cut to a desired length, the cap sealing the first and second fluid carrying plenums at the end of the APT probe portion; and
- an elongated body coupled to the APT probe portion and providing fluid passageways fluidically coupled to the first and second plenums for coupling process pressures from the first and second plenums to the pressure sensor such that the pressure sensor provides as an output pressure measurements indicative of the flow rate of process fluid in the process pipe;
- wherein the distal end comprises a plurality of predefined cutting regions identified by visual indicators selected for the particular confined conduit, the APT probe portion distal end formed by cutting the APT probe portion at the one of the plurality of predefined cutting regions.

10. The system of claim 9, and further comprising an electronics connection mounted on the elongated body to operably couple the process variable transmitter to the elongated body and the APT probe portion.

11. The system of claim 9, wherein the elongated body has a diameter which is larger than a diameter of the APT probe section.

12. The system of claim 11, wherein the elongated body is configured to couple the customizable APT probe to the pipe using a plurality of different types of connection hardware configurations.

13. The system of claim 11, wherein the APT probe portion is configured with the plurality of longitudinally arranged openings in the upstream surface and in the downstream surface such that the upstream surface and the downstream surface can be cut to produce a plurality of desired probe lengths to accommodate different conduit diameters while maintaining structural integrity of the APT probe portion.

14. The system of claim 9, and further comprising communication circuitry, in the process variable transmitter, configured to couple to and communicate over a process control loop.

15. The system of claim 14, wherein the communication circuitry is configured to communicate wirelessly.

16. The system of claim 14, and further comprising measurement circuitry coupled to the pressure sensor and configured to provide a sensor output.

17. The system of claim 16, and further comprising a controller coupled to the measurement circuitry and to the communication circuitry.

18. The system of claim 17, and further comprising a storage memory device configured to store configuration information based upon the desired length to which the APT probe portion has been cut.

19. The system of claim 9, and further comprising an opposite side support structure couplable to the pipe and to the distal end of the APT probe portion to support the distal end of the APT probe portion after insertion into the pipe.

* * * * *